United States Patent Office 2,779,974
Patented Feb. 5, 1957

2,779,974

PREPARATION OF HIGHLY POLYMERIC MATERIAL IN A FORM SUITABLE FOR TRANSPORT

Joseph Billing and Cyril Bostock, Spondon, near Derby, England, assignor to British Celanese Limited, a corporation of Great Britain No Drawing. Application August 20, 1952, Serial No. 305,496

Claims priority, application Great Britain September 5, 1951

7 Claims. (Cl. 18—47.5)

This invention relates to the production of organic highly polymeric materials, especially organic derivatives of cellulose, in a form suitable for transport.

Organic acid esters of cellulose and cellulose ethers are usually obtained in the form of flakes, fibres or other moderate-sized particles, and in these forms they are rather bulky. For example, cellulose acetate flake as received from an acetylation plant may have a bulk density between about 23 and 27 lb./cu. ft. or even lower. Bulk densities of this order are a disadvantage when the cellulose derivative has to be transported in large quantities, owing to the space occupied by the material.

We have found that simple compression of the bulky particulate cellulose derivative into blocks is not satisfactory. Certainly the bulk density of the material can be increased by this means, but the blocks formed are either difficult to break down again into a divided form in which the cellulose derivative can easily be dissolved for use, or are too friable, especially near their edges, or suffer from both disadvantages. Resistance to breaking down for re-use is characteristic of materials which have been highly compressed, and friability is more in evidence with materials which have been compressed to a smaller degree, though both defects may be present together. It is an object of the present invention to provide a process whereby bulky particulate cellulose derivatives and under organic highly polymeric materials can be converted into blocks of higher density which are easily broken down again for use but which are not unduly friable.

According to the invention, bulky particulate organic highly polymeric materials, especially cellulose derivatives, are compressed, at temperatures below their thermal softening temperatures, into blocks having a density not exceeding 85%, and preferably not exceeding 75%, of the true density of the material, and a skin is formed on the blocks by applying a small quantity of a solvent for the material to the surfaces of the blocks and then removing it. (The term "thermal softening temperature" is employed to denote the temperature at which individual particles of the material begin to stick together under the action of heat alone.)

Before the material is compressed it is preferably ground, as by this means a product can be obtained which is more easily broken down for re-use. The material, whether ground or not, is preferably compressed at about atmospheric temperature, but it may be at a higher temperature so long as this is below its thermal softening temperature. Advantageously the material is compressed to a bulk density between 50 and 70% of its true density. For example, cellulose acetate can be compressed at about room temperature under a pressure of about 1.0–1.5 tons/sq. in. to give a product of bulk density about 52–65% of its true density.

The material may be compressed into blocks of any desired form, for example of cylindrical or rectangular cross-section. It is very advantageous that the moulds employed in forming the blocks should have rounded edges, so producing blocks with rounded edges, and we have found that this simple precaution considerably increases the resistance of the blocks to crumbling.

When the blocks have been formed, a solvent for the material is applied to their surfaces and then removed, in order to form a continuous skin over all the surfaces of the blocks. It is preferable to employ an easily vaporised solvent, both because it can easily and efficiently be removed by evaporation, and because the volatility of the solvent makes it easy to avoid permanently and unevenly contaminating the material with remnants of the solvent. For example blocks of an acetone-soluble cellulose acetate may be treated with acetone, and blocks of a water-soluble cellulose ether with water. The solvent may be applied to the surfaces of the blocks in any suitable way; for example it may be sprayed or poured onto the several surfaces, or the block may be immersed for a short time in a body of the solvent. The solvent may be allowed to penetrate the block to a depth between about .005 and 0.1 inch, after which it is rapidly removed, preferably by evaporation. Advantageously a current of heated air or other gas may be directed against the blocks to accelerate the evaporation of the solvent. It is found that the skins produced by the action of the solvent on the blocks are unexpectedly strong even when quite thin; thus skins which are only about 0.005–0.025 inch thick are found to be capable of holding together blocks having dimensions for example up to about 12 inches in any direction. With larger blocks, or if the blocks are to be subjected to rough handling, skins of thickness up to about 0.1 inch or more may be formed.

Blocks produced in accordance with the invention are resistant to the ordinary disruptive forces attending transport, undergoing little or no crumbling even at the edges, especially if the latter be rounded. On the other hand they can readily be broken down, e. g. by impact attrition in a hammer mill or like device, so as to yield the cellulose acetate or other material in a state of subdivision in which it can easily be dissolved in appropriate solvents.

The invention is of particular value when applied to cellulose acetate, whether made by the solution or the suspension type of process, especially when the cellulose acetate is in a form having a bulk density below about 30 lb./cu. ft. It may however also be applied to other cellulose esters, e. g. cellulose propionate, butyrate, acetate propionate, acetate butyrate, and acetate stearate, to cellulose ethers, e. g. methyl cellulose, ethyl cellulose, carboxymethyl cellulose and benzyl cellulose, and to non-cellulosic organic highly polymeric materials which are soluble in volatile solvents and have been obtained in forms having a bulk density considerably below their true density, for example such copolymers comprising vinyl chloride, vinylidene chloride, vinyl acetate, or acrylonitrile as are soluble in acetone, and such high linear condensation polymers of the polyamide, polyurethane and polyester types as are soluble in alcohol.

The invention is illustrated by the following example.

Example

An acetone-soluble cellulose acetate of moisture content 4.56% had a bulk density of about 25 lb./cu. ft. This material was ground, and then compressed at room temperature in a cylindrical mould having rounded edges, and operated under a pressure of about 1.4 tons/sq. inch. Acetone was sprayed onto the surfaces of the block so obtained, and rapidly removed by evaporation in a current of warm air. The block had a density of about 50 lb./cu. ft., was resistant to crumbling, and yet could easily be broken down in a hammer mill into a form very suitable for solution.

Having described our invention, what we desire to secure by Letters Patent is:

1. Process for converting particulate cellulose acetate of bulk density below 30 lb. per cubic foot into a form more suitable for transport, which comprises compressing the cellulose acetate, while it is free from solvents and softening agents and at a temperature below its thermal softening temperature, into a block having a density between 50% and 75% of the true density of the cellulose acetate, applying a volatile solvent for the cellulose acetate to the surfaces of the block, allowing the solvent to penetrate the block to a depth of 0.005–0.1 inch, and then removing the solvent by evaporation, thereby forming on the block a continuous skin of thickness between 0.005 and 0.1 inch to thus produce a block which is resistant to the ordinary disruptive forces attending transport but which can be readily broken down by impact attrition in a hammer mill or like device.

2. Process for converting particulate acetone-soluble cellulose acetate of bulk density below 30 lb. per cubic foot into a form more suitable for transport, which comprises compressing the cellulose acetate, while it is free from solvents and softening agents and at a temperature below its thermal softening temperature, into a block having a density between 50% and 75% of the true density of the cellulose acetate, applying acetone to the surfaces of the block, allowing the acetone to penetrate the block to a depth of 0.005–0.1 inch, and then evaporating the acetone, thereby forming on the block a continuous skin of thickness between 0.005 and 0.1 inch to thus produce a block which is resistant to the ordinary disruptive forces attending transport but which can be readily broken down by impact attrition in a hammer mill or like device.

3. Process for converting acetone-soluble cellulose acetate of bulk density below 30 lb. per cubic foot into a form more suitable for transport, which comprises grinding the cellulose acetate to a powder, compressing the powder, while it is free from solvents and softening agents and at a temperature below its thermal softening temperature, into a block having a density between 50% and 70% of the true density of the cellulose acetate, applying acetone to the surfaces of the block, allowing the acetone to penetrate the block to a depth of 0.005–0.1 inch, and then evaporating the acetone, thereby forming on the block a continuous skin of thickness between 0.005 and 0.1 inch.

4. Process according to claim 2, wherein the cellulose acetate is compressed into a block having its largest dimension at most 12 inches, and the acetone is allowed to penetrate the block to a depth of 0.005 to 0.025 inch.

5. Process according to claim 3, wherein the cellulose acetate is compressed into a block having its largest dimension at most 12 inches, and the acetone is allowed to penetrate the block to a depth of 0.005 to 0.025 inch.

6. Process according to claim 2, wherein the cellulose acetate is compressed into a block having at least one dimension exceeding 12 inches, and the acetone is allowed to penetrate the block to a depth of 0.025 to 0.1 inch.

7. Process according to claim 3, wherein the cellulose acetate is compressed into a block having at least one dimension exceeding 12 inches, and the acetone is allowed to penetrate the block to a depth of 0.025 to 0.1 inch.

References Cited in the file of this patent
UNITED STATES PATENTS

| | | |
|---|---|---|
| 1,770,573 | Haavardsholm | July 15, 1930 |
| 2,142,968 | Stoesser | Jan. 3, 1939 |
| 2,209,940 | Smith | July 30, 1940 |
| 2,282,421 | Luby | May 12, 1942 |
| 2,346,210 | Farguhar | Apr. 11, 1944 |